United States Patent [19]

Turovsky et al.

[11] 4,125,465

[45] Nov. 14, 1978

[54] METHOD OF EFFLUENT SLUDGE TREATMENT

[76] Inventors: Izrail S. Turovsky, Molodezhnaya ulitsa, 3, kv. 292; Leonic L. Goldfarb, Uralskaya ulitsa, 6, korpus 6, kv. 48; Leonid V. Zamoschin, Leninsky prospekt, 144, korpus 5, kv. 48; Alexandr I. Zhukov, pereulok M. Gorkogo, 4, kv. 5, all of Moscow, U.S.S.R.

[21] Appl. No.: 733,341

[22] Filed: Oct. 18, 1976

Related U.S. Application Data

[63] Continuation of Ser. No. 571,021, Apr. 22, 1975, abandoned.

[51] Int. Cl.$^2$ ............................................. B01D 21/01
[52] U.S. Cl. ...................................... 210/46; 210/68; 210/10; 71/8
[58] Field of Search .................... 210/20, 15, 56, 5, 6, 210/9, 46, 66, 67, 68, 73 S, 74, 71

[56] References Cited

U.S. PATENT DOCUMENTS

| | | | |
|---|---|---|---|
| 3,342,731 | 9/1967 | Baumann et al. | 210/10 |
| 3,440,166 | 4/1969 | Davis et al. | 210/10 |
| 3,963,470 | 6/1976 | Haug | 210/15 |

*Primary Examiner*—Charles N. Hart
*Assistant Examiner*—Benoit Castel
*Attorney, Agent, or Firm*—Fleit & Jacobson

[57] ABSTRACT

A method of treating effluent sludge, which comprises coagulating sludge with mineral coagulants, thereafter subjecting the sludge to mechanical dehydration. The dehydrated sludge is dried to a moisture content of from 10 to 50 percent with the aid of a gaseous heat carrier having an initial temperature of from 600° to 800° C under backflow and air-gushing conditions. Dried sludge is introduced into the raw sludge at the coagulation stage at a rate so as to provide for a concentration of the resultant sludge mixture of from 50 to 120 g/lit.

5 Claims, No Drawings

METHOD OF EFFLUENT SLUDGE TREATMENT

This is a continuation of application Ser. No. 571,021, filed Apr. 22, 1975, now abandoned.

The present invention relates to the field of effluent treatment and more, particularly, to a method of effluent sludge treatment.

The method of this invention may find application at municipal sewage- and industrial effluent treatment plants.

It is known in the art to treat effluent sludge by fermentation in sludge digesters and subsequently drying the sludge, on landfills. Thereafter, the sludge is collected from the landfills and employed as fertilizer or else transported to dumping grounds.

This prior art technique has the following disadvantages considerable plots of land in suburban are as are required to be allotted to landfills;

the hygienic standards of landfills are very low;

sludge removal from landfills involves complicated procedures;

the operation of sludge digesters is a sophisticated and very expensive proposition.

In order to overcome the foregoing disadvantages there was developed a method of effluent sludge treatment comprising coagulating sludge with mineral coagulants, viz. ferric chloride and lime (up to 3 to 8 percent $FeCl_3$ and 15 to 22 percent lime), mechanically dehydrating the sludge, e.g. on rotary vacuum filters with a descending cloth, and drying the dehydrated sludge with the aid of a gaseous heat carrier having an initial temperature of from 600° to 800° C. under counter-jets and air-gushing conditions.

The latter technique requires the consumption of a substantial quantity of mineral coagulants at the coagulation stage. Besides, the mechanical sludge dehydration units employed in this method have a low output, and the high moisture content of the post-dehydration sludge (up to 80 to 85 percent) hampers further sludge treatment.

The present invention contemplates providing a method of effluent sludge treatment with such coagulation conditions as would permit cutting down the rate of consumption of chemical reagents and raising the output of the treatment plants.

These and other objects are attained by the provision of a method of effluent sludge treatment, comprising coagulating sludge with mineral coagulants, mechanically dehydrating the sludge, and drying the dehydrated sludge to a moisture content of from 10 to 50 percent with the aid of a gaseous heat carrier having an initial temperature of from 600° to 800° C. under counter-jets and air-gushing conditions, wherein, in accordance with the invention, dried sludge is introduced into the starting sludge at the coagulation stage at a rate providing for a concentration of the resultant sludge mixture of from 50 to 120 g/lit.

It is recommended that the dried sludge introduced into the starting sludge at the coagulation stage have a moisture content of from 10 to 30 percent.

In order to minimize consumption of mineral coagulants, it is recommended that the starting sludge should either be divided into two portions, one portion being coagulated with mineral coagulants while the other being coagulated with the aid of the dried sludge obtained in the treatment of the former sludge portion, or else the starting sludge should be subjected to coagulation alternately with mineral coagulants and the dried sludge obtained in the treatment of the starting sludge with mineral coagulants. The effect of the dried sludge consists in the reuse of the mineral coagulants contained therein, increased concentration of the solid phase of the sludge, aggregation of the solid particles and redistribution of the moisture contained therein toward a higher proportion of weakly-bound forms of moisture.

The addition of the dried sludge permits the reduction of the rate of consumption of the coagulants, improves the operating efficiency of the units for mechanical dehydration of the sludge, and reduces the moisture content of the dehydrated sludge.

The sludge treated according to the method this invention, particularly the sludge of municipal sewage, may find application as a valuable organo-mineral fertilizer. The fertilizer according to the proposed method may be produced as a bulk material (granular and powder-like) containing nitrogen, phosphorus, potassium, lime and fertilizing trace elements (boron, cobalt, nickel, manganese, molybdenum, etc.). Application of said dried sludge into soil sown to a variety of agricultural crops improves crop yields by 1.5 to 2.5 times and simultaneously improves the soil structure. The fertilizer may be applied once every three years at the rate of 10 to 15 tons per hectare.

Should the sludge contain toxic substances which are prohibitive for sludge utilization, after undergoing the treatment in accordance with the present invention, the sludge may be incinerated or else transported to dumping grounds.

The proposed method of effluent sludge treatment is carried out as follows.

Mineral coagulants and dried sludge having a moisture content of from 10 to 50 percent, preferably from 10 to 30 percent, are added to the starting sludge obtained in the course of mechanical, biological or physicochemical effluent treatment. The mineral coagulants may be, for instance, ferric chloride and lime in the form of 10-percent solutions. Instead of ferric chloride, use can be made of ferric sulphate, aluminium chloride or industrial waste products containing said compounds. Instead of lime, use can be made of industrial waste products in the form of milk of lime, e.g. waste products of acetylene production.

The use of thermally dried sludge having a moisture content not exceeding 30 percent as an additive to the starting sludge ensures a rapid and sufficiently complete mixing of the dried sludge having an adequately extended reaction surface with the starting sludge. Such mixing, as well as coagulation of the sludge with coagulants, may be effected, for instance, in a tank equipped with a screw pump for mixing and subsequently feeding the coagulated mixture to a unit for mechanical dehydration of the sludge.

In accordance with the proposed method, the concentration of the mixture of the starting and dried sludge is maintained within the range of from 50 to 120 g/lit, and provides for an adequate fluidity of the mixture (concentration not higher than 120 g/lit) when combined with a sufficiently high level of solids (concentration not less than 50 g/lit.). The concentration of the mixture may be maintained within the above specified limits by controlling the quantity and moisture content of the sludge being admixed.

The mineral coagulants, e.g. ferric chloride and lime, and dried sludge are added to the entire quantity of the starting sludge or only to a portion thereof; thus, for instance, chemical reagents may be added to half the amount of sludge, whereas dried sludge containing said coagulants is added to the rest of the sludge. The latter technique is employed if maximum economy of mineral coagulants is the primary consideration. The required quantity of coagulants and the amount of reused sludge are determined by the water loss of the sludge at the mechanical dehydration stage.

Mechanical dehydration of the coagulated mixture is effected on filter apparatus, e.g. rotary vacuum filters with a descending cloth, or on filter presses. The set of operating conditions of the apparatus (the extent of the vacuum and the filtration time) as well as the type of filter cloth are determined as in the prior art method, i.e. they are selected experimentally depending on the type of sludge to be dehydrated.

The mechanically dehydrated sludge is delivered with the aid of a conveyor to a thermal drying unit operating under counter-jets and air-gushing conditions; counter-jets type dryers may be employed as the thermal drying units. The drying procedure is effected with the aid of a gaseous heat carrier, e.g. flue gas having an initial temperature of from 600° to 800° C. obtained by burning natural gas, fuel oil or some other fuel in fire chambers under pressure (fire chambers of the dryer). To provide for the process of fuel burning and sludge drying, compressed air having an overpressure of 0.1 to 0.5 gauge atmosphere is supplied into the burners.

The dried sludge, except for that portion thereof which is earmarked for mixing with the starting sludge at the coagulation stage, is conveyed, for instance with the aid of a scraper conveyor, to a hopper wherefrom the sludge is loaded into dump trucks to be transported to agricultural fields or dumping grounds, or else delivered to ovens for incineration.

Practice of the novel method of this invention is illustrated by the following exemplary embodiments thereof, it being clearly understood that the method of this invention is not limited thereto.

EXAMPLE 1

The sludge of municipal sewage having a moisture content of 93.5 percent and a specific resistance of $250 \times 10^{10}$ cm/g is subjected to coagulation, mechanical dehydration on rotary vacuum filters with a descending cloth, and thermal drying in a countercurrent-type dryer.

Prior to dehydration, thermally dried sludge having a moisture content of 20 percent, ferric chloride and lime are added to the sludge in respective amounts of 100, 3.2 and 10 percent by weight of the sludge dry matter.

It should be noted that in this example, just as in all examples that follow, the amounts of ferric chloride or its substitutes are given in terms of a pure chemical substance; the amounts of lime are given in terms of calcium oxide.

The concentration of the mixture of the starting sludge with that being admixed is 120 g/lit; the moisture content of the dehydrated sludge is 61 percent; the output of the rotary vacuum filter is 25 kg/sq.m per hour in terms of the sludge dry matter. The moisture content of the thermally dried sludge (end product) is 40 percent. The heat input of the drying procedure is 800 large calories per kilogram of moisture being evaporated. Having undergone the treatment in accordance with the invention, the sludge (end product) is utilized in agriculture as a granulated organo-mineral nitrogenous-phosphorus fertilizer enriched with lime and fertilizing trace elements and designed for use on acid soils. Introduced once every three years at the rate of 15 tons per hectare into soil planted to maize cultivated for green fodder, the fertilizer raises the crop yield from 80 to 200 centners (one centner is equal to 100 kilograms) per hectare. Should the sludge have been treated according to the prior art method, the amounts of ferric chloride and lime would have been 3.5 and 12 percent, respectively, at an output of the vacuum filter of 20 kg/sq.m. per hour and at a moisture content of the dehydrated sludge of 80 percent.

Thus, the method of this invention effects a saving of ferric chloride and lime amounting to 8 and 16 percent, respectively, simultaneously improving the output of the vacuum filter by 25 percent and reducing the moisture content of the dehydrates sludge from 80 to 61 percent.

EXAMPLE 2

The sludge of the effluent of a paper-and-pump mill having a moisture content of 97.5 percent and a specific resistance of $560 \times 10^{10}$ cm/g is subjected to coagulation, mechanical dehydration on rotary vacuum filters and thermal drying in a countercurrent-type dryer. Prior to dehydration, the thermally dried sludge having a moisture content of 10% as well as ferric chloride and lime, are added to the sludge in respective amounts of 100, 3.5 and 13.6 percent by weight of the sludge dry matter. The concentration of the mixture of the starting sludge with that being admixed is 50 g/lit; the moisture content of the dehydrated sludge is 70.5 percent; the moisture content of the thermally dried sludge is 30 percent; and the output of the vacuum filters is 18.5 kg/sq.m. per hour in terms of the sludge dry matter.

Having been treated according to the method of this invention, the sludge is transported to the dumping ground; the volume of the end product is almost 15 times less than that of the starting sludge.

Sludge treatment according to the prior art method would have required 4 percent of ferric chloride and 15 percent of lime; the output of the vacuum filters would have been 15 kg/sq.m. per hour; and the moisture content of the dehydrated sludge would have been 85 percent.

Thus, the proposed method provides a 12-percent economy in the use of ferric chloride and a 9-percent economy of lime; the moisture content of the dehydrated sludge is reduced from 85 to 70.5 percent; while the output of the vacuum filters is raised by 20 percent.

EXAMPLE 3

The sludge of municipal sewage having a moisture content of 95.0 percent and a specific resistance of $400 \times 10^{10}$ cm/g is subjected to coagulation, mechanical dehydration on rotary vacuum filters with a descending cloth, and thermal drying in counter-jets type driers. For feasibility reasons the process utilizes minimal amounts of chemicals.

Prior to dehydration, the starting sludge is divided into two equal flows. Ferric sulphate and lime are added to one flow at respective rates of 6 and 14 percent; and the dried sludge of the former flow having a moisture content of 30 percent is added to the second flow. The concentration of the sludge mixture of the first and second flows is 90 g/lit.; the moisture content of the sludge of the first flow is 80.0 percent and that of the second flow is 66.5 percent; the output of the vacuum filters of the first and second flows is 90 kg/sq.m. per hour.

The thermally dried sludge of the second flow (end product) is a substantially granular material having a moisture content of 40 percent and employed as a fertilizer.

Thus, the proposed method permits halving the rate of consumption of chemical reagents also reduces the moisture content of half the dehydrated sludge from 80 to 66.5 percent.

EXAMPLE 4

The sludge of the effluent of an auto works having a moisture content of 93 percent and a specific resistance of $200 \times 10^{10}$ cm/g is subjected to coagulation, dehydration on a filter press and drying in a counter-jets type dryer.

The plant operates on a batch principle.

During the first 8 hours, the entire amount of sludge is dehydrated and dried, with the starting sludge being coagulated with the aid of ferric chloride and milk of lime (waste product of acetylene production) taken at respective rates of 4 and 12 percent by weight of the sludge dry matter. During the next 8 hours, thermally dried sludge is added to the starting sludge at a rate providing for a rise in the concentration of the mixture being dehydrated to 100 g/lit. After the treatment, according to the proposed method, the sludge is a bulk granular product having a moisture content of 40 percent and which is transported to the dumping ground.

The method of this invention permits halving the consumption having a chemical reagents.

EXAMPLE 5

The sludge of municipal sewage having a moisture content of 95.5 percent and a specific resistance of 750 $\times 10^{10}$ cm/g is subjected to coagulation, mechanical dehydration on rotary vacuum filters with a descending cloth and thermal drying in counter-jets type dryers.

Prior to dehydration, the starting sludge is divided into two flows with a volume flow rate ratio of 1.5:1. Waste products of bromine production containing ferric chloride together with lime are added to one flow at respective rates of 4 and 12 percent; and dry sludge of the former flow having a moisture content of 35 percent is added to the second flow. The concentration of the mixture of sludge of the first and second flows is 110 g/lit.; the moisture content of the dehydrated sludge of the first flow is 78 percent; and that of the second flow is 68 percent; the output of the vacuum filters of the first flow is 17 kg/sq.m. per hour while that of the vacuum filters of the second flow is 17 kg/sq.m. per hour.

The thermally dried sludge of the second flow (end product) is a substantially granular material having a moisture content of 35 percent which is utilized as a fertilizer.

Thus, the proposed method permits cutting down the consumption of chemical reagents by 40 percent, improving the output of vacuum filters by an average of 3 percent, and reducing the moisture content of the dehydrated sludge from 78 to 68 percent.

What is claimed is:

1. A method of treating effluent sludge, which comprises treating sludge with mineral coagulants so as to coagulate the sludge; mechanically dehydrating the resulting sludge; drying the dehydrated sludge to a moisture content of from 10 to 50 percent by means of a gaseous heat carrier having an initial temperature of from 600° to 800° C. under counter-jet and air-gushing conditions; introducing at the coagulation stage dried sludge into the starting sludge at a rate so that a concentration of the sludge mixture thus obtained is from 50 to 120 g/lit.

2. A method as set forth in claim 1, wherein said dried sludge introduced into the starting sludge at the coagulation stage has a moisture content of from 10 to 30 percent.

3. A method as set forth in claim 1, wherein the starting sludge is divided into two portions; one portion of the starting sludge is coagulated with the aid of mineral coagulants, and the other portion of the starting sludge is coagulated with the aid of dried sludge obtained in the treatment of a former sludge portion, 4. A method as set forth in claim 1, wherein the starting sludge is coagulated alternately with the aid of mineral coagulants and dried sludge obtained in the treatment of the starting sludge with the aid of mineral coagulants.

5. A method of effluent sludge treatment, which comprises treating sludge with at least one mineral coagulant selected from the group consisting of ferric chloride, ferric sulfate and calcium oxide; mechanically dehydrating the sludge; drying the dehydrated sludge to a moisture content of from 10 to 50 percent by means of a gaseous heat carrier having an initial temperature of from 600° to 800° C. under counter-jet and air-gushing conditions; introducing at the coagulation stage, dried sludge into the starting sludge at a rate so that the concentration of the sludge mixture thus obtained is from 50 to 120 g/lit.

* * * * *